UNITED STATES PATENT OFFICE.

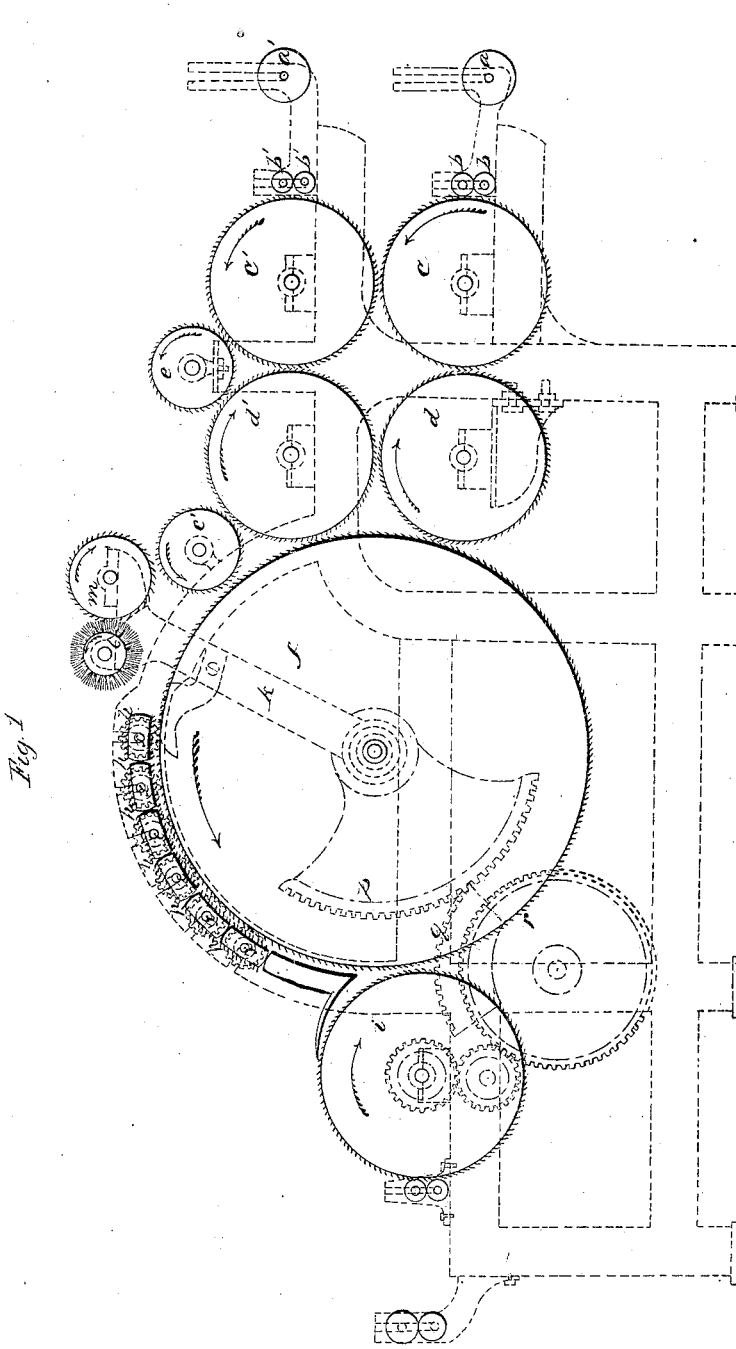

W. H. WALTON, OF BROOKLYN, NEW YORK.

IMPROVEMENT IN CLEANING THE TOP-FLATS OF CARDING-ENGINES.

Specification forming part of Letters Patent No. 16,196, dated December 9, 1856.

*To all whom it may concern:*

Be it known that I, WILLIAM H. WALTON, of the city, county, and State of New York, have invented certain new and useful Improvements in Carding Machinery, in which the figure is a vertical longitudinal section.

My invention relates to an improvement in stripping the top-flats or lags of machine-cards by certain automatic apparatus; and my invention consists in suspending the top flats or lags upon pivots placed in the center of their ends, with toothed pinions upon them, by which they are raised from their position and turned over to be stripped, and also in the employment of a rotating brush to strip the flats or lags, which is so arranged as to be in its turn stripped by a cylinder-card that returns the strippings to the main cylinder.

The construction of the machine is as follows:

The position of the main carding-cylinder, the doffer, and their accessories, together with their construction, are the same as the ordinary carding-machines now in use; but instead of a single feed I have two separate points of feeding in the "lickers-in," being also "workers," and so arranged and working together as to cause the cotton to be fairly and evenly presented to the main carding-cylinder, the lumps, &c., being in great measure carried back and worked over.

$a\ a'$ are the two rolls from which the cotton is delivered to the machine. They are placed one directly above the other. From thence it passes to and between two small rollers $b\ b$. The cotton from the lower feed $a$ passes onto a clothed cylinder $c$. That from $a'$ passes in the same way onto cylinder $c'$. The two cylinders $c\ c'$ work together and partially straighten and equalize the fibers. From thence the cotton is taken onto the lickers-in $d\ d'$, where it is again worked, in aid of which there is above and between $d'$ and $c'$ a small top worker $e$. The course of revolution of these rollers is indicated by arrows, and they are driven by gearing in a manner well known to machinists and carding-machine makers. A similar small worker to $e$ is placed at $e'$, nearer the main cylinder than $e$ and working into cylinder $d'$, by all of which apparatus the material is evened and more perfectly prepared for delivery onto the main cylinder $f$. This cylinder runs in contact with the lickers-in $d$ and $d'$, and from each receives the fibers for carding rapidly, evenly, and properly in quantity much greater than has ever before been effected in a given time. Cylinder $f$ passes around to the lags or top workers $h$, and thence to the doffer $i$, whence it passes out of the machine in the usual way. Each of the lags or top workers $h$ is clothed on both sides, and its ends rest on a ledge of the permanent frame, outside of which there is an upward projection of the frame, having recesses in it that serve for bearings to round journals $x$, which project from the ends of the workers $h$. At one end there is a pinion affixed to the journal of each worker $h$. An arm $k$ is centered on the journals of the axis of the main cylinder $f$, on each side, which project upward above the top of said cylinder $f$ and form bearings for a cylindrical brush $l$, of small diameter, and a clothed cylinder or doffer $m$ a little behind and above it. When the arms $k$ sweep forward, the brush, which is in rapid revolution, driven by a band from the pulley on the main cylinder-shaft, brushes over and cleans the side of the lags or workers $h$ that is uppermost, the brush being in turn cleaned by the revolving card-cylinder $m$, whence the fibers are conveyed to the cylinder $e'$, and are reconveyed upon the cylinder $f$. As the arms $k$ move forward, as above stated, a projecting piece $k'$ strikes the workers and raises them from their bed, and the piece $k'$ on one side being cogged, takes into the pinions on their journals and causes each to make a semi-revolution, thus bringing the working-surface up to be cleaned by the action of the brush $l$, which succeeds. The arms $k$ have a segment-gear $p$ affixed to them that gears into a segment $q$ on a revolving wheel $r$, driven by gearing from the doffer $i$. There are two of these wheels $r$ and they run in opposite directions, by which means the arms $k$ vibrate first forward and then back. (The gearing is shown in the drawing in blue ink.)

Having thus fully described my improvements in carding-machines, what I claim, and desire to secure by Letters Patent, is—

1. Suspending the top-flats or lags upon pivots in the center of their ends, by which they can be raised out of the way of the adjoining flats or lags, to be turned by means of a rack working in pinions upon their pivots, or the equivalent thereof, the whole being constructed and arranged substantially as herein described, for the purposes set forth.

2. Stripping the flats or workers by a rotating brush so arranged that a card may in turn strip the brush and return the strippings to the main cylinder, substantially in the manner and for the purposes described.

W. H. WALTON.

Witnesses:
SAML. COLMAN,
GEO. H. PHINNE.